(12) United States Patent
Isami et al.

(10) Patent No.: US 12,330,506 B2
(45) Date of Patent: Jun. 17, 2025

(54) SHIFTING DEVICE FOR ELECTRIC VEHICLE HAVING VIRTUAL MANUAL TRANSMISSION SYSTEM

(71) Applicant: TOYOTA JIDOSHA KABUSHIKI KAISHA, Toyota (JP)

(72) Inventors: Yoichiro Isami, Mishima (JP); Hiroyuki Amano, Susono (JP); Takayuki Oshima, Susono (JP); Makoto Takano, Sunto-gun (JP); Yuta Tsukada, Sunto-gun (JP); Kiyosuke Hayamizu, Susono (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/310,160

(22) Filed: May 1, 2023

(65) Prior Publication Data

US 2023/0382238 A1 Nov. 30, 2023

(30) Foreign Application Priority Data

May 27, 2022 (JP) .................................. 2022-086559

(51) Int. Cl.
*B60L 15/20* (2006.01)

(52) U.S. Cl.
CPC ......... *B60L 15/20* (2013.01); *B60L 2240/423* (2013.01); *B60L 2240/50* (2013.01); *B60L 2250/00* (2013.01)

(58) Field of Classification Search
CPC ................. B60L 15/20; B60L 15/2054; B60L 2240/423; B60L 2240/50; B60L 2240/12; B60L 2240/421; B60L 2250/00; B60L 2250/26; B60L 2260/42; B60Y 2200/91; F16H 59/105; F16H 59/044; F16H 2061/6615; F16H 2061/0227; F16H 61/0204; F16H 63/42; F16H 2200/0021
See application file for complete search history.

(56) References Cited

U.S. PATENT DOCUMENTS

| | | | |
|---|---|---|---|
| 9,435,425 B2* | 9/2016 | Heo | F16H 59/105 |
| 2003/0172757 A1* | 9/2003 | Yone | F16H 63/42 |
| | | | 74/335 |
| 2021/0229550 A1 | 7/2021 | Isami | |
| 2021/0309113 A1* | 10/2021 | Mazzini | B60L 7/14 |
| 2022/0041155 A1 | 2/2022 | Isami et al. | |

FOREIGN PATENT DOCUMENTS

| | | | |
|---|---|---|---|
| JP | 6787507 B1 | | 11/2020 |
| JP | 2021151168 A | * | 9/2021 |
| JP | 2022-30834 A | | 2/2022 |

* cited by examiner

*Primary Examiner* — Michael J Zanelli
(74) *Attorney, Agent, or Firm* — Oblon, McClelland, Maier & Neustadt, L.L.P.

(57) ABSTRACT

A shifting device for an electric vehicle having a virtual manual transmission system, that is configured to realize a variety of shift patterns and torque characteristics. The shifting device comprises: an indicator that indicates a shift pattern; and an indication switcher that switches the shift pattern indicated in the indicator to another pattern. At least any one of the number of the shift positions and a virtual gear stage assigned to the shift position in the shift pattern switched by the indication switcher is different from that in the previous shift pattern indicated in the indicator before switched by the indication switcher.

11 Claims, 7 Drawing Sheets

SHIFTING DEVICE FOR ELECTRIC VEHICLE HAVING VIRTUAL MANUAL TRANSMISSION SYSTEM

CROSS-REFERENCE TO RELATED APPLICATIONS

The present disclosure claims the benefit of Japanese Patent Application No. 2022-086559 filed on May 27, 2022 with the Japanese Patent Office.

BACKGROUND

Field of the Invention

Embodiments of the present disclosure relate to a shifting device for an electric vehicle having an electric motor as a prime mover, and more specifically, to a shifting device adapted to simulate behavior of conventional vehicles having an internal combustion engine and a manual transmission.

Discussion of the Related Art

JP-B2-6787507 describes one example of an electric vehicle having a shift device to simulate the behavior of a vehicle having a manual transmission. To this end, according to the teachings of JP-B2-6787507, patterns of torque characteristics of an electric motor (i.e., a relation between a speed and a torque) are set in each virtual gear stage, and the electric motor generates a torque in accordance with the torque characteristics selected by operating a shift device. The number and patterns of the torque characteristics may be altered arbitrarily. For example, the number of the virtual gear stage may be six stages or more, or less than six stages. In addition, the preset pattern of the torque characteristics may be modified by partially altering a torque curve to a lower side. Thus, the patterns of the torque characteristics are not limited, and hence a driver is allowed to select a desired pattern in line with his/her preference.

The shift device described in JP-B2-6787507 has a shift lever operated to select the virtual gear stage. For example, in the conventional shift pattern, a selector path extends transversely, and a plurality of shift paths extends perpendicular to the selector slot. Each of the shift paths individually extends toward forward positions and a reverse position, and a neutral position is located at one of intersections between the selector path and the shift paths. For example, the shift pattern may be indicated in a top surface of a knob of the shift lever.

As described, the electric vehicle described in JP-B2-6787507, the virtual gear stages are not limited by the structure of the electric vehicle, and the number of virtual gear stages and the torque characteristics of the electric motor may be altered arbitrarily. Therefore, the driver is allowed to select the torque characteristics in line with his/her preference in the virtual gear stage selected by operating the shift lever. However, since the gear stage is selected by operating the shift lever, the number of selectable torque characteristics (i.e., the virtual gear stage) is limited to the number of the shift positions. Thus, the number of the virtual gear stages and the torque characteristics may not be altered sufficiently.

In addition, since the virtual gear stages and the torque characteristics are not restricted by the structure of the electric vehicle but restricted to the structure of the shift device, the driver may not confirm the currently selected virtual gear stage or the virtual gear stage to be selected by operating the shift lever directly from a position of the shift lever. For example, in the electric vehicle described in JP-B2-6787507, a plurality of virtual gear stages (i.e., the torque characteristics) may be allotted to one of the shift positions due to e.g., the limitation of an available space in the shift device. In this case, therefore, the driver may not confirm the currently selected virtual gear stage or the virtual gear stage to be selected by operating the shift lever directly from the position of the shift lever.

Thus, it is preferable to improve the drivability of electric vehicles having a virtual manual transmission system utilizing flexibilities of the numbers of virtual gear stages and the characteristics of the torque of the motor serving as a prime mover.

SUMMARY

Aspects of embodiments of the present disclosure have been conceived noting the foregoing technical problems, and it is therefore an object of the present disclosure to provide a shifting device for an electric vehicle having a virtual manual transmission system, that is configured to realize a variety of shift patterns and torque characteristics, and to allow a driver to easily select a desired virtual gear stage or torque characteristics.

According to the exemplary embodiment of the present disclosure, there is provided a shifting device for an electric vehicle having a virtual manual transmission system. The shifting device is configured to select torque characteristics as a relation between a speed and a torque of an electric motor serving as a prime mover from a plurality of the torque characteristics individually associated with each virtual gear stage, and in the electric vehicle, the virtual gear stage is selected by a manual shifting operation. In order to achieve the above-explained objectives, according to the exemplary embodiment of the present disclosure, the shifting device is provided with: an indicator that indicates a shift pattern having a plurality of shift positions to which the virtual gear stages are assigned; and an indication switcher that transmits a command to switch the shift pattern indicated in the indicator to another pattern. According to the exemplary embodiment of the present disclosure, at least any one of the number of the shift positions and the selected virtual gear stage assigned to the shift position in the shift pattern indicated in the indicator that is switched from the previous shift pattern by the indication switcher is different from the at least any one of the number of the shift positions and the selected virtual gear stage in the previous shift pattern previously indicated in the indicator.

In a non-limiting embodiment, the shift pattern may be selected from a plurality of patterns in which the at least any one of the number of shift positions and the virtual gear stage assigned to the shift position is different. In addition, the indication switcher may be configured to transmit a command to indicate the selected shift pattern in the indicator.

In a non-limiting embodiment, the indicator may be configured to indicate a part of the shift pattern in the indicator. In addition, the indication switcher may be configured to transmit a command to switch the part of the shift pattern indicated in the indicator.

In a non-limiting embodiment, the indication switcher may be configured to transmit the command to switch the shift pattern in accordance with a speed of the electric vehicle.

In a non-limiting embodiment, the indication switcher may be configured to transmit the command to switch the shift pattern in response to a manual operation executed by a driver of the electric vehicle.

In a non-limiting embodiment, the shifting device may further comprise a torque characteristics controller that transmits a command to control the electric motor to generate torque in line with the torque characteristics associated with the selected virtual gear stage assigned to the shift position. In addition, the torque characteristics controller may be configured to maintain the current torque characteristics after the shift pattern is switched to the another pattern and the selected virtual gear stage indicated in the indicator is changed.

In a non-limiting embodiment, the torque characteristics controller may be further configured to transmit a command to control the electric motor to generate torque in line with the torque characteristics associated with the current virtual gear stage assigned to the current shift position in the shift pattern switched from the previous shift pattern.

Thus, according to the exemplary embodiment of the present disclosure, the virtual gear stages are assigned to the shift positions in the shift pattern, and the shift pattern selected from a plurality of patterns is indicated in the indicator. Therefore, characteristics of the torque of the electric motor is changed by selecting the virtual gear stage in the selected shift pattern. The shift pattern indicated in the indicator may be switched by the indication switcher to another pattern in which at least any one of the number of the shift positions and the virtual gear stage assigned to the shift position is different. Therefore, even if the selected shift pattern is larger than the indicator and hence the selected shift pattern may not be indicated entirely in the indicator, the virtual gear stage may be selected from more options than the number of the shift positions indicated in the indicator. That is, characteristics of the torque generated by the electric motor may be varied as much as possible utilizing the characteristics of the electric vehicle, and hence the driver is allowed to enjoy operation of the electric vehicle.

In addition, a layout of the shift pattern is not structurally restricted and may be altered arbitrarily. Therefore, the shift pattern may be customized in line with a preference of the driver so that the driver is allowed to enjoy the virtual manual shifting operation of the electric vehicle.

If the selected shift pattern is larger than the indicator, the shift pattern may be indicated partially in the indicator. In this case, the part of the shift pattern indicated in the indicator may be scrolled to indicate the other part of the shift pattern. Therefore, the driver is allowed to confirm the entire configuration of the selected shift pattern easily and continuously, and this will help the driver to enjoy the virtual shifting operation easily.

For example, the shift pattern may be switched between a basic pattern for low-speed running and a basic pattern for high-speed running. In this case, the shift pattern may be switched automatically between those patterns depending on a speed of the electric vehicle. That is, the shift pattern indicated in the indicator may be switched easily without requiring a switching operation.

Otherwise, the shift pattern indicated in the indicator may also be switched manually to select the shift pattern and the virtual gear stage in line with his/her preference. In this case, for example, the driver is allowed to execute a skip shift easily if desired.

In the situation where the shift pattern is switched to another pattern, the current torque characteristics may be maintained until the virtual gear stage is shifted by the driver, even after the shift pattern is switched to another pattern and consequently the shift position indicated in the indicator is changed. In this case, the driver will not be upset by an unintentional change in the behavior of the electric vehicle.

Instead, the torque characteristics may also be changed immediately when the shift pattern is switched to another pattern and consequently the shift position indicated in the indicator is changed. In this case, the torque of the electric motor is changed promptly in line with the characteristics associated with the shift position in the newly selected shift pattern. Therefore, the behavior of the electric vehicle may be changed quickly in response to a change in the shift position indicated in the indicator.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
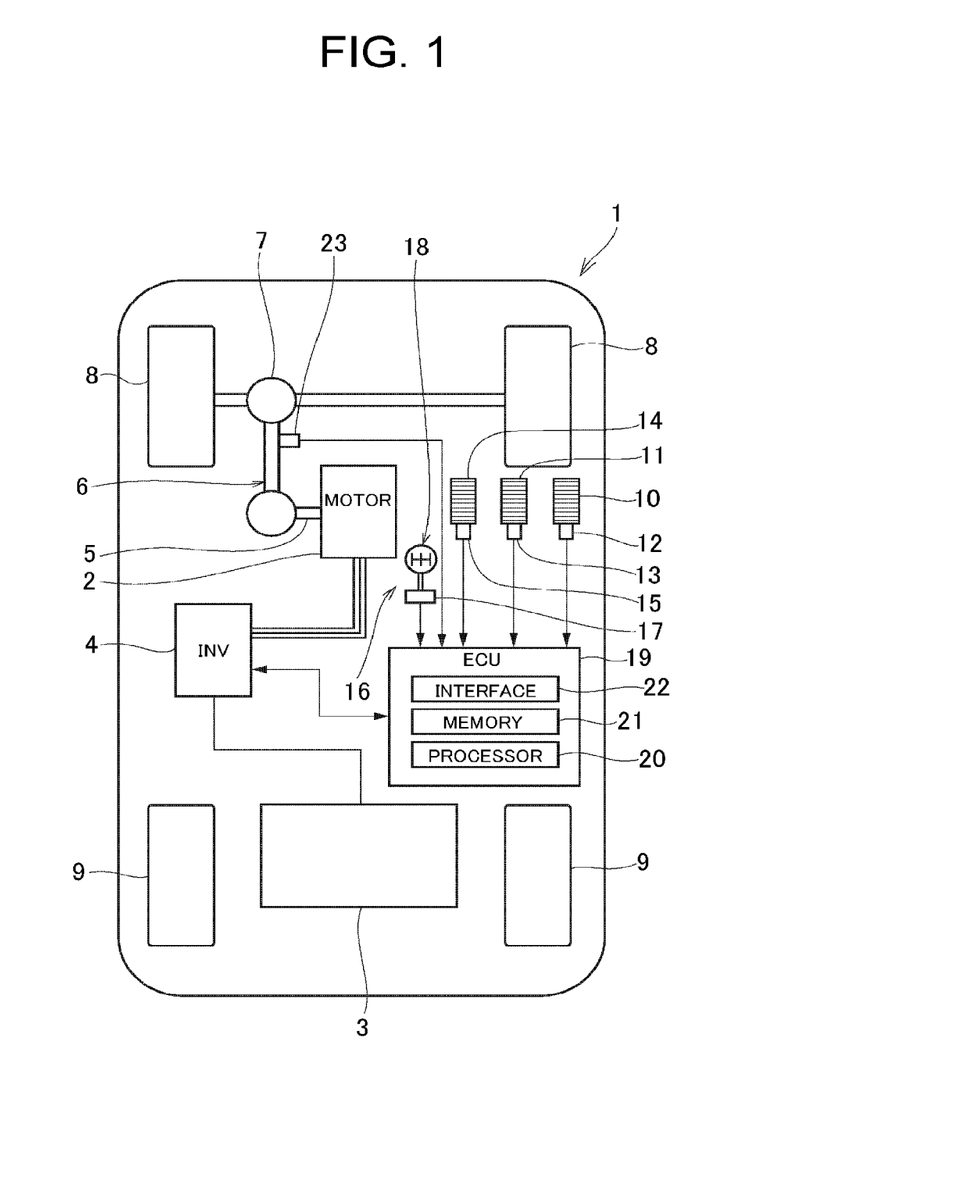
FIG. 1 is a schematic illustration showing a structure and a control system of an electric vehicle to which the shifting device according to the exemplary embodiment of the present disclosure is applied.

For example, the shifting device according to the exemplary embodiment of the present disclosure may be applied to an electric vehicle having a structure similar to that of the electric vehicle described in JP-B2-6787507. Turning now to FIG. 1, there is shown a structure of the electric vehicle 1 to which the shifting device according to the exemplary embodiment of the present disclosure is applied. In the electric vehicle 1, an electric motor 2 serves as a prime mover, and a drive torque of the electric motor 2 is controlled by controlling an electric current supplied from an electric storage device (i.e., a battery) 3 to the electric motor 2 by an inverter (referred to as INV in FIG. 1) 4. In order to propel the electric vehicle 1, an output torque of the electric motor 2 is delivered from an output shaft (i.e., a rotor shaft) 5 of the electric motor 2 to a differential gear unit 7 as a final reduction unit through a transmission mechanism 6 including a gear mechanism and a transmission shaft, and distributed from the differential gear unit 7 to a pair of drive wheels 8. Thus, the electric vehicle 1 is not provided with a speed change mechanism, and hence the torque is transmitted from the electric motor 2 to the drive wheels 8 at a fixed ratio. As can be seen from FIG. 1, the torque of the electric motor 2 is not delivered to another pair of wheels 9.

The electric vehicle 1 is accelerated and decelerated by operating an accelerator pedal 10, and decelerated or stopped by operating a brake pedal 11. A depression (i.e., a position) of the accelerator pedal 10 representing a driving force required by the driver is detected by an accelerator sensor 12, and a depression of the brake pedal 11 or a pedal force applied to the brake pedal 11 is detected by a brake sensor 13. In order to allow a driver to imitate a manual shifting operation, the electric vehicle 1 is provided with a clutch pedal 14 and a shift lever 16, and a position or an operating amount of the clutch pedal 14 is detected by a clutch sensor 15. For example, as a shift lever of the conventional vehicles having a manual transmission, the shift lever 16 is allowed to move along a selector path extending in a width direction of the electric vehicle 1 (i.e., in the transverse direction in FIG. 1) and shift paths individually extending perpendicular to the selector path. Virtual gear stages including a plurality of forward stages and a reverse stage are assigned to each end of the shift paths, and a desired virtual gear stage is selected by moving the shift lever 16 toward the end of the shift path to which the desired virtual gear stage is assigned. A neutral position is located at one of intersections between the selector path and the shift paths, and a neutral stage is selected by returning the shift lever 16 to the neutral position. To this end, a position of the shift lever 16 is detected by a shift position sensor 17. Thus, according to the exemplary embodiment of the present disclosure, a shifting device includes the shift lever 16 and the shift position sensor 17. A structure of the shifting device 18 will be explained later in more detail.

The electric motor 2 is controlled by an electronic control unit (hereinafter simply referred to as ECU) 19 through the inverter 4. The ECU 19 comprises a microcomputer including a CPU (i.e., a processor) 20, a memory 21 such as a RAM and a ROM, an input-output interface 22. The accelerator sensor 12, the brake sensor 13, the clutch sensor 15, and the shift position sensor 17 are connected to the ECU 19 to shat detection signals of those sensors are transmitted to the ECU 19. In addition, a detection signal of a speed sensor 23 that detects a rotational speed of the transmission mechanism 6 (e.g., a rotational speed of a propeller shaft) is also transmitted to the ECU 19.

For example, in order to adjust a drive torque generated by the electric motor 2 to be delivered to the transmission mechanism 6 to a required drive torque, the ECU 19 may be configured to execute the torque control taught by JP-B2-6787507. According to the exemplary embodiment of the present disclosure, specifically, the ECU 19 is configured to change the drive torque generated by the electric motor 2 to propel the electric vehicle 1 in such a manner as to simulate or imitate a change in a torque in the conventional vehicle having a manual transmission. For example, by depressing the clutch pedal 14 deeper than a predetermined position during propulsion, a virtual clutch output torque is reduced with an increase in a depression of the clutch pedal 14, and the virtual clutch output torque is reduced to zero when the clutch pedal 14 is depressed to a deepest position.

Specifically, the virtual clutch output torque is a simulated output torque of a clutch arranged in the conventional vehicle having a manual transmission. The virtual clutch output torque may be calculated by multiplying a virtual engine output torque being delivered from the electric motor 2 to the drive wheels 8 by a gain which varies in accordance with a depression of the clutch pedal 14. Specifically, the gain is maintained to 1 (i.e., 100%) as long as the depression of the clutch pedal 14 falls within a range from 0 to a predetermined angle, and reduced from 1 with an increase in the depression of the clutch pedal 14 from the predetermined angle.

The virtual engine output torque is a simulated output torque of an engine arranged in the conventional vehicle. Specifically, characteristics of the virtual engine output torque is set by simulating output characteristics of an arbitrarily selected conventional vehicular engine as a relation between a speed and an output torque of said conventional vehicular engine. To this end, a virtual engine speed is calculated based on a rotational speed of the drive wheel 8 taking account of a virtual speed ratio and a virtual clutch slippage, and the virtual engine output torque is calculated based on the virtual engine speed and the simulated output characteristics.

When the virtual clutch output torque is reduced to zero and an actual torque to propel the electric vehicle 1 drops temporarily, the driver is supposed to select a desired virtual gear stage by operating the shift lever 16. Then, the clutch pedal 14 is returned gradually by the driver, that is, a depression of the clutch pedal 14 is reduced gradually. Consequently, the above-mentioned gain is increased so that the virtual clutch output torque is increased. As a result of selecting the desired virtual gear stage, the virtual speed ratio employed to calculate the virtual engine speed has been changed. In this situation, therefore, the virtual engine speed and the virtual engine output torque are changed. Consequently, a torque determined by the virtual engine output torque thus changed and the virtual clutch output torque is generated by the electric motor 2.

That is, the electric motor 2 is controlled to change the output torque thereof in line with the torque characteristics (i.e., a relation between the rotational speed and the output torque) selected by the above-explained virtual shifting operation. Thus, in the electric vehicle 1 powered only by the electric motor 2, the virtual gear stage (i.e., the virtual speed ratio) is shifted by operating the shift lever 16 and the clutch pedal 14 so that the driver is allowed to enjoy a manual shifting operation virtually. As mentioned above, such control of the drive torque generated by the electric motor in response to the virtual manual shifting operation is explained in detail e.g., in JP-B2-6787507.

Here will be explained a structure of the shifting device 18. According to the exemplary embodiment of the present disclosure, the driver is allowed to select the desired torque characteristics by manually operating the shifting device 18. To this end, the shifting device 18 is provided with an operating device such as the shift lever 16. The shift lever 16 includes a gear stick erected on a floor or a center console and a shift lever extending from a steering column. In addition, the operating device further includes a paddle shifter mounted behind a steering wheel.

Figure 2:
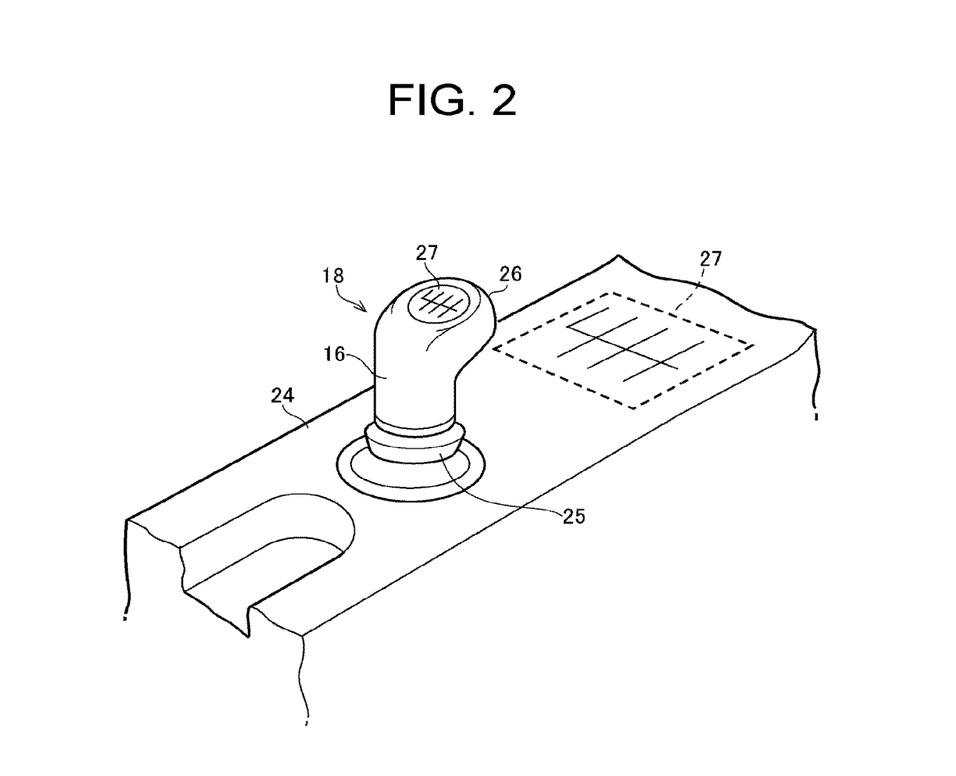
FIG. 2 is a perspective view showing one example of the shifting device in which a shift lever is erected on a center console.

Turning to FIG. 2, there is shown one example of the shift lever 16. In the example illustrated in FIG. 2, the shift lever 16 is mounted on a center console 24. A base portion of the shift lever 16 is covered with a rubber hole cover 25, and a knob 26 is formed on a tip of the shift lever 16. Thus, the shift lever 16 shown in FIG. 2 is an imitation shifter of the conventional vehicle having a manual transmission. The shift lever 16 is allowed to be moved not only transversely (i.e., in the width direction) along a selector path, but also longitudinally (i.e., in the front-back direction) along shift paths extending perpendicular to the selector path. As the shift lever 16, a gear stick of the conventional shifting device may be employed.

Shift positions are located at each end of the shift path so that a desired virtual gear stage is selected by moving the shift lever 16 to the end of the shift path at which the shift position of the desired virtual gear is located. According to the exemplary embodiment of the present disclosure, the number of shift positions may not be equal to the number of the selectable virtual gear stages. For example, the shift pattern may consist of the transverse selector path and a pair of shift paths extending from both ends of the transverse selector path perpendicular thereto. In this case, the shift positions are located on both ends of the shift paths and the shift lever 16 is moved among those four positions. In addition, the shift lever 16 is not necessary to be held to the shift position. That is, the shift lever 16 may be returned to an initial position or a neutral position located on the selector path after being moved to the desired shift position.

The movement of the shift lever 16 to the desired shift position is detected by the shift position sensor 17, and the shift position sensor 17 transmits a detection signal to the ECU 19.

In the example shown in FIG. 2, an indicator 27 is arranged on a top surface of the knob 26. For example, a diagram of the shift pattern, available virtual gear stages, a current position of the shift lever 16 may be indicated in the indicator 27. According to the exemplary embodiment of the present disclosure, a liquid crystal display is adopted as the indicator 27. Therefore, desired letters, diagrams, patterns etc. may be indicated arbitrarily in a desired color on the indicator 27.

Figure 3:
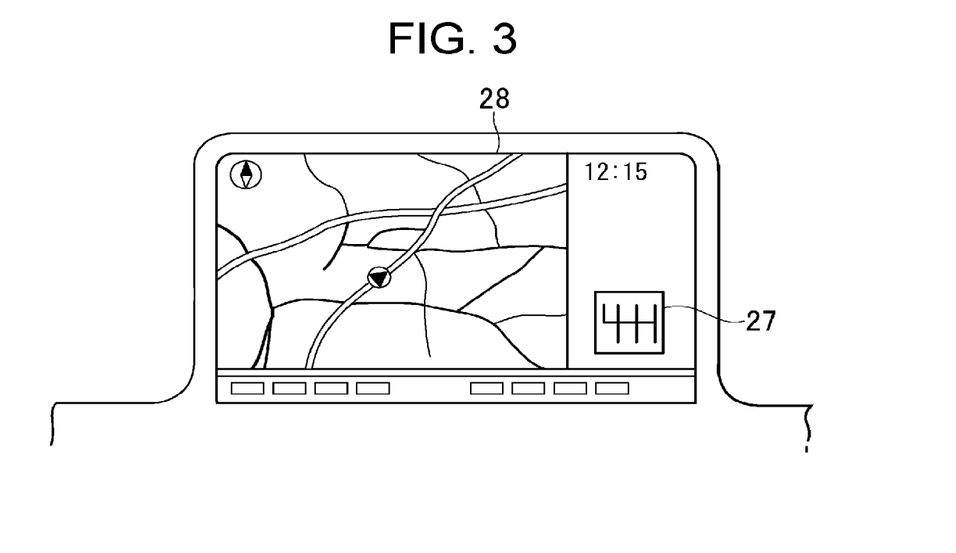
FIG. 3 is a schematic illustration showing one example of the indicator arranged in a monitor.

A position of the indicator 27 may be altered according to need. For example, the indicator 27 may be arranged on a top panel of the shifting device 18 (or the center console 24) within a region enclosed by the dashed line box. Otherwise, as illustrated in FIG. 3, the indicator 27 may also be indicated in a monitor 28 of a navigation system next to a map information, a television picture, or an audio indicator.

A plurality of diagrams of different shift patterns are stored in the memory 21, and a selected diagram of shift pattern is indicated in the indicator 27. Each of the diagrams individually includes numbers representing the shift positions or the virtual gear stages. If the selected diagram is larger than the indicator 27, the selected diagram may be dragged by a finger on the screen of the indicator 27 thereby indicating a desired part of the selected diagram.

Figure 4A:
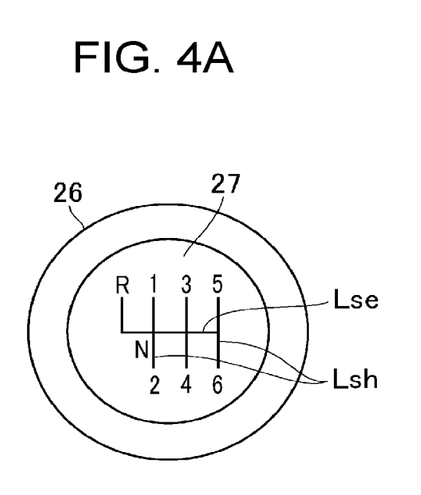
FIG. 4A is a schematic illustration showing one example of a basic shift pattern selected in a low speed range.
Figure 4B:
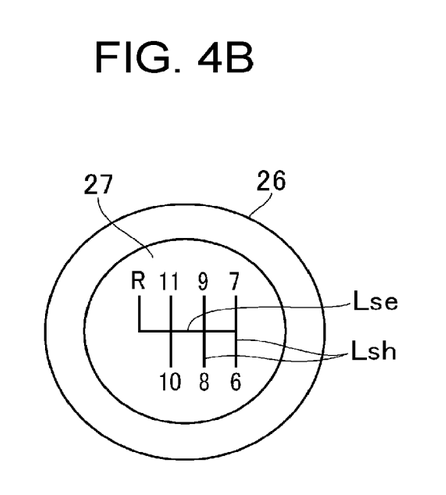
FIG. 4B is a schematic illustration showing one example of a basic shift pattern selected in a high speed range.

Here will be explained examples of the shift pattern with reference to FIGS. 4A to 7. FIG. 4A shows a shift pattern for low-speed running, and FIG. 4B shows a shift pattern for high-speed running. Each of the shift patterns shown in FIGS. 4A and 4B consists of a transverse selector path Lse, and a plurality of longitudinal shift paths Lsh individually extending perpendicular to the transverse selector path Lse. In the shift pattern for low-speed running shown in FIG. 4A, the reverse position for selecting a reverse stage and the first to the sixth forward positions for selecting low to middle speed virtual gear stages are located at leading ends of the longitudinal shift paths Lsh. In addition, the neutral position N is located at an intersection between the transverse selector path Lse and one of the longitudinal shift paths Lsh extending between the first forward position and the second forward position. For example, when the shift lever 16 is positioned at the neutral position, the electric vehicle 1 is virtually brought into a neutral stage. Whereas, in the shift pattern for high-speed running shown in FIG. 4B, the sixth to the eleventh forward positions for selecting middle to high speed virtual gear stages are located at leading ends of the longitudinal shift paths Lsh. However, contrary to the shift pattern for low-speed running, the sixth to the eleventh forward positions are arranged in order from the lower stage to the higher stage from right to left in FIG. 4B.

Arrangement of the shift positions may be altered arbitrarily. In the shift patterns shown in FIGS. 4A and 4B, the odd positions are located on upper ends of the longitudinal shift paths Lsh, and the even positions are located on lower ends of the longitudinal shift paths Lsh. Whereas, in the shift pattern shown in FIG. 5, the shift positions are arranged in line with the preference of the driver. In the shift pattern shown in FIG. 5, specifically, the third forward position is located on the upper end of the third shift path Lsh from the left and the fifth forward position is located on the lower end of the same shift path Lsh, and the fourth forward position is located on the upper end of the fourth shift path Lsh from the left and the sixth forward position is located on the lower end of the same shift path Lsh. Next, in the shift pattern shown in FIG. 6, the longitudinal shift paths Lsh extend only downwardly and perpendicularly from the transverse selector path Lse, and the first to nineth forward positions are located on the lower ends of the longitudinal shift paths Lsh in order from left to right.

Figure 7:
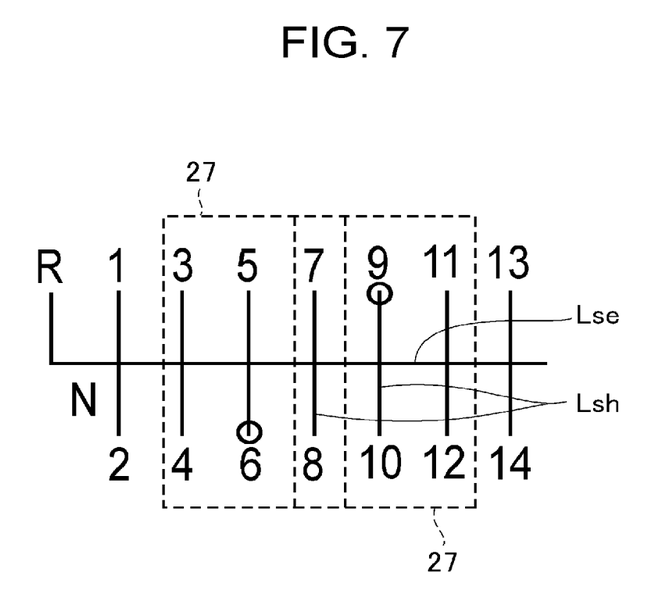
FIG. 7 is a diagram showing yet another example of the shift pattern that is larger than the indicator and may not be indicated entirely in the indicator.

FIG. 7 shows an example of the shift pattern which is too large to be indicated entirely in the indicator 27. Specifically, FIG. 7 shows an example of the shift pattern as a combination of the shift patterns shown in FIGS. 4A and 4B. In a case that the shift pattern shown in FIG. 7 is selected, only a part of the shift pattern enclosed by the dashed line box is indicated in the indicator 27. That is, only three longitudinal shift paths Lsh may be indicated in the indicator 27 at a maximum. The shift pattern shown in FIG. 7 may be scrolled from side to side based on a vehicle speed or a switching operation executed by the driver thereby switching a part of the shift pattern indicated in the indicator 27. For example, a part of the shift pattern including the longitudinal shift paths Lsh extending on both sides of the longitudinal shift paths Lsh in which a shift position of the currently selected virtual gear stage (marked with ○ in FIG. 7) is located is indicated in the indicator 27. Therefore, the part of the shift pattern indicated in the indicator 27 may also be shifted based on a shifting operation of the virtual gear stage.

According to the exemplary embodiment of the present disclosure, the larger number of the virtual gear stages than the number of virtual gear stages indicated in the indicator 27 are selectable by operating the shift lever 16. Whereas, the shift lever 16 may also be adapted to be moved in a criss-cross manner with respect to the neutral position located on the transverse selector path Lse. In this case, the shift lever 16 is moved between the left position and the right position of the neutral position, and between the upper position and the lower position of the neutral position. That is, a range of movement of the shift lever 16 may also be set among the above-mentioned four positions. A position of the shift lever 16 may be detected by a position sensor of the shift position sensor 17. For example, the shift position sensor 17 may be adapted to transmit a detection signal in accordance with a travelling amount of the shift lever 16 in the transverse direction or the lateral direction. In this case, the shift position of the shift lever 16 or the selected virtual gear stage may be determined by detecting a moving direction and a travelling amount of the shift lever 16 by counting the detection signal transmitted from the shift position sensor 17.

As described, the shift pattern may be selected from a plurality of patterns. That is, if the shift pattern is shifted to another pattern, the current shift position selected by the shift lever 16 may not always correspond to the shift position in the newly selected shift pattern indicated in the indicator 27. Therefore, the shift position selected by the shift lever 16 is determined based on a combination of a positional signal representing a current position of the operating device such as the shift lever 16 and a signal representing the shift pattern currently indicated in the indicator 27. In the case that the shift pattern is switched to another pattern and consequently the shift position indicated in the indicator 27 is changed from the position selected by operating the shift lever 16, the virtual gear stage may be shifted immediately to the stage assigned to the new shift position in said another pattern indicated in the indicator 27. Alternatively, the virtual gear stage may also be shifted in response to an operation of the shift lever 16 to another position to be executed after the shift pattern is switched to another pattern. That is, in this case, the characteristics of the torque is maintained to the characteristics associated with the virtual gear stage assigned to the shift position which has been selected before the shift pattern is switched to another pattern, until the shift lever 16 is operated to another position.

Figure 8:
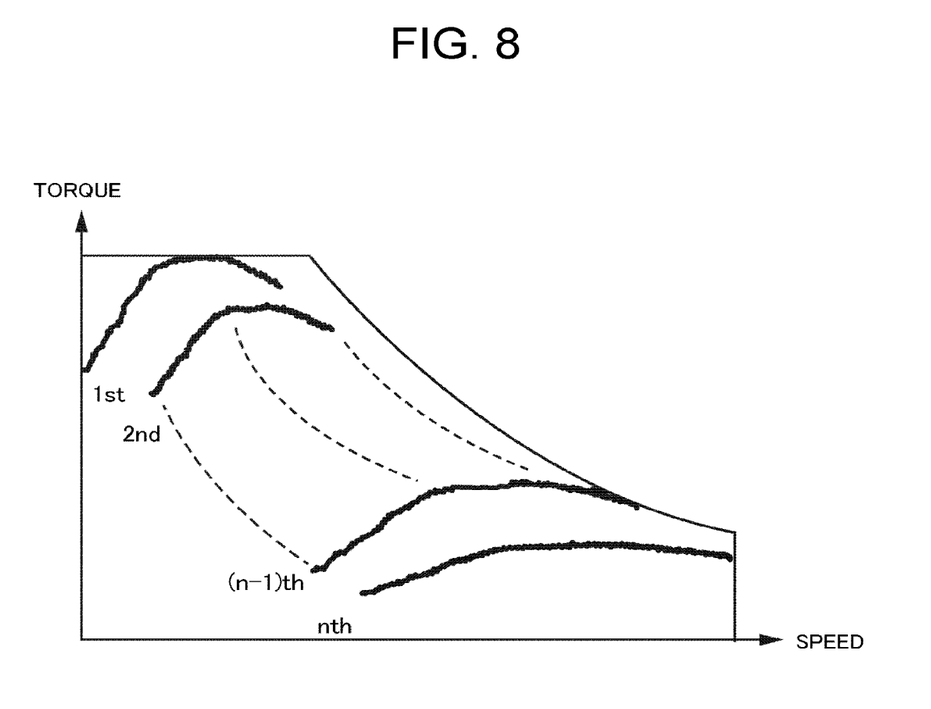
FIG. 8 is a graph showing one example of torque characteristics individually associated with the virtual gear stages.

Characteristics of the torque generated by the electric motor 2 are set for each of the virtual gear stages. Specifically, the characteristics of the torque generated by the electric motor 2 is a relation between an output torque and a speed of the electric motor 2, and each of the characteristics is individually associated with each of the virtual gear stages. According to the exemplary embodiment of the present disclosure, the characteristics of the torque for each of the virtual gear stages are stored in the memory 21 in the form of map. Specifically, those characteristics of the torque are set in line with characteristics of a driving force propelling the conventional vehicle having a manual transmission. According to the exemplary embodiment of the present disclosure, the number of selectable virtual gear stages is larger than the number of gear stages available in the conventional vehicle having a manual transmission. That is, according to the exemplary embodiment of the present disclosure, characteristics of the torque may be varied more finely compared to the driving force propelling the conventional vehicle having a manual transmission. Turning to FIG. 8, there is shown one example of a shift map according to the exemplary embodiment of the present disclosure. As can be seen from FIG. 8, a relation between a speed and an output torque of the electric motor 2 is determined in each of the virtual gear stage (i.e., virtual speed ratio) from the first forward stage to the highest stage n. Therefore, the electric motor 2 is controlled in line with the characteristics associated with the selected virtual gear stage.

Specifically, when the virtual gear stage is selected by operating the shift lever 16, the characteristics of the torque is determined with reference to the map shown in FIG. 8, and the electric motor 2 is controlled to change the output torque in line with the characteristics associated with the selected virtual gear stage. According to the exemplary embodiment of the present disclosure, the number of selectable virtual gear stages and the characteristics of the torque associated therewith are not restricted by factors other than a mechanical structure and a capacity of the electric motor 2. Instead, the characteristics of torque may also be set as new characteristics peculiar to the electric vehicles.

Figure 9:
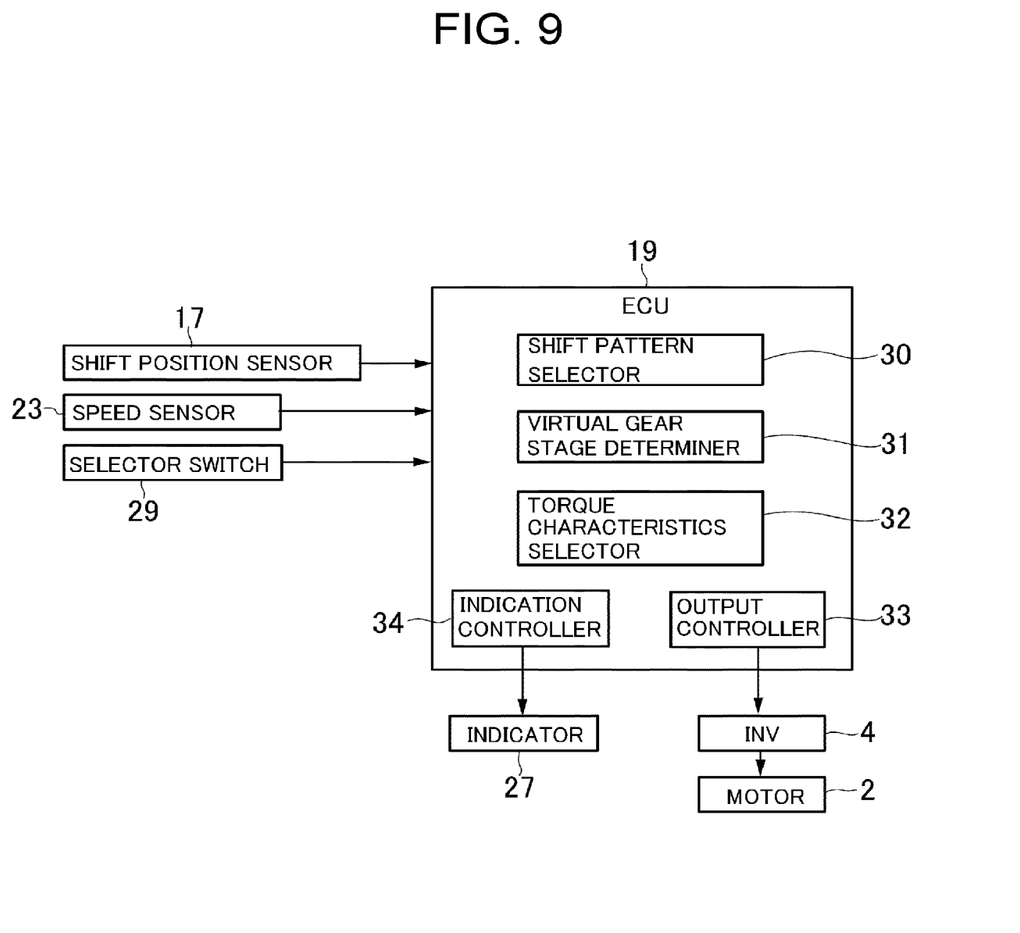
FIG. 9 is a block diagram showing functions of the controller.

The ECU 19 is configured to: select the shift pattern to be indicated in the indicator 27; switch the shift pattern indicated in the indicator 27; determine the selected virtual gear stage; select the characteristics of torque in the selected virtual gear stage; and control the electric motor 2 in line with the selected characteristics of torque. Those functions of the ECU 19 are shown in FIG. 9. As illustrated in FIG. 9, to the ECU 19, a signal representing a position of the shift lever 16 is transmitted from the shift position sensor 17, a signal representing a speed of the electric vehicle 1 is transmitted from the speed sensor 23, a signal representing a selected shift pattern to be indicated in the indicator 27 is transmitted from a selector switch 29. For example, the selector switch 29 may be arranged on an instrumental panel or a steering wheel (neither of which are shown) of the electric vehicle 1. Instead, the selector switch 29 may also be indicated as a button in a touch panel screen.

The ECU 19 comprises a shift pattern selector 30 that selects a shift pattern from the shift patterns stored in the ECU 19. Specifically, the shift pattern selector 30 selects a shift pattern to be indicated in the indicator 27 from e.g., the shift patterns shown in FIGS. 4A to 7 based on the signals transmitted from the shift position sensor 17, the speed sensor 23, and the selector switch 29. As explained with reference to FIG. 7, the selected shift pattern may be indicated partially in the indicator 27 if it is larger than the indicator 27. In this case, the part of the selected pattern indicated in the indicator 27 may be scrolled to indicate the other part of the shift pattern.

The ECU 19 further comprises a virtual gear stage determiner 31 that determines the virtual gear stage in the selected shift pattern that is selected by operating the shift lever 16. As described, the number of the shift positions selectable by moving the shift lever 16 is restricted depending on the structure of the shifting device 18 and the available space in the shifting device 18. Whereas the number of the selectable virtual gear stages and the characteristics of torque associated therewith are larger than the number of the shift positions. Therefore, the virtual gear stage is determined as a shift position in the shift pattern selected by shift pattern selector 30 and the signal transmitted from the shift position sensor 17.

The ECU 19 further comprises: a torque characteristics selector 32 that selects the characteristics of the torque of the electric motor 2 associated with the virtual gear stage determined by the virtual gear stage determiner 31; and an output controller 33 that controls the electric motor 2 and the inverter 4 in line with the characteristics of the torque of the electric motor 2 selected by the torque characteristics selector 32. Accordingly, the torque characteristics selector 32 and the output controller 33 serve as a torque characteristics controller of the exemplary embodiment of the present disclosure. In addition, the ECU 19 further comprises an indication controller 34 as an indication switcher that indicates the selected shift pattern in the indicator 27 and the virtual gear stage selected in the shift pattern indicated in the indicator 27.

Figure 5:
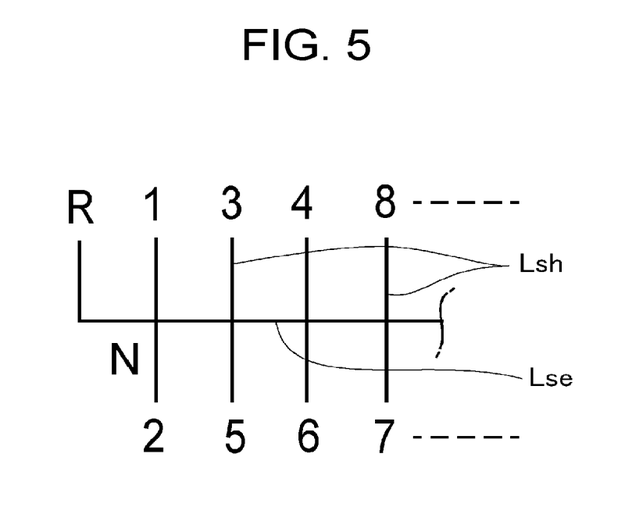
FIG. 5 is a diagram showing another example of the shift pattern in which the larger number of shift positions are arranged in different order.
Figure 6:
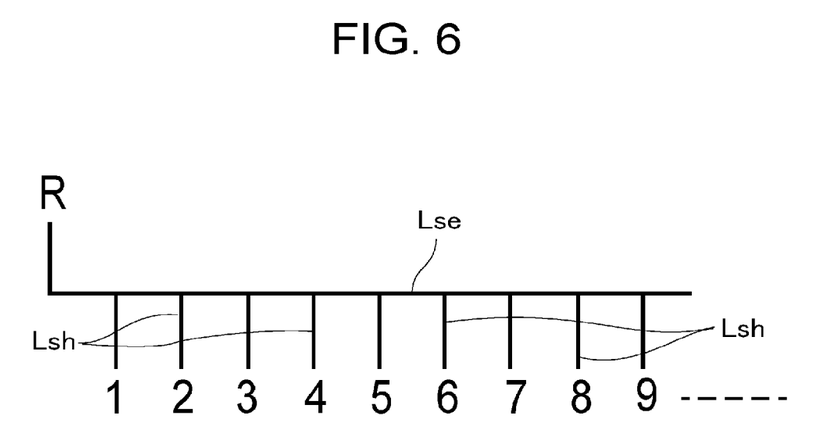
FIG. 6 is a diagram showing still another example of the shift pattern in which the shift positions are arranged laterally.
Figure 10:
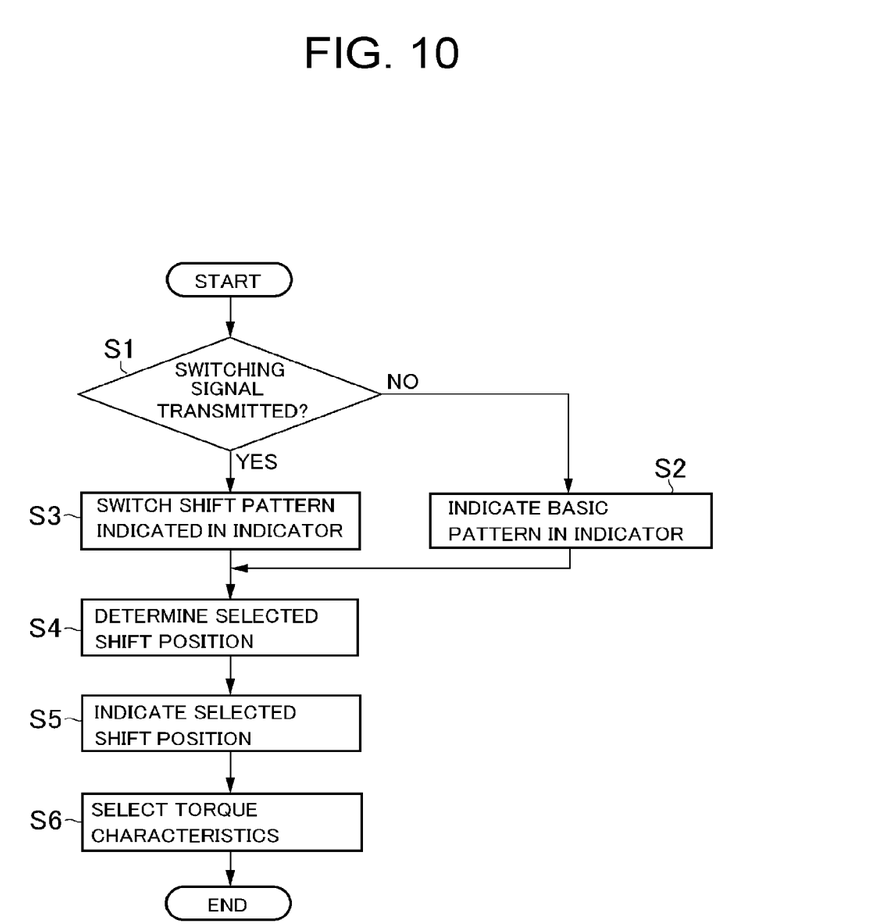
FIG. 10 is a flowchart showing one example of a routine executed by the controller.

Turning to FIG. 10, there is shown one example of a routine executed by the ECU 19. At step S1, it is determined whether a switching signal to switch the shift pattern indicated in the indicator 27 is transmitted. For example, in the situation where the shift pattern shown in FIG. 4A is indicated in the indicator 27, the switching signal to switch the shift pattern indicated in the indicator 27 to the shift pattern shown in FIG. 4B is transmitted from the indication controller 34 when a speed of the electric vehicle 1 exceeds a predetermined speed (e.g., 100 km/h). Otherwise, the switching signal to switch the shift pattern indicated in the indicator 27 to any of the shift patterns shown in FIGS. 5 to 7 is also transmitted by operating the selector switch 29. At step S1, therefore, transmission of the switching signal based on a speed of the electric vehicle 1 or an execution of an operation of the selector switch 29 is determined.

If the answer of step S1 is NO, the routine progresses to step S2 to transmit a command to indicate a basic pattern in the indicator 27 from the indication controller 34. For example, the shift pattern shown in FIG. 4A or 4B may be set as the basic patterns. Otherwise, the shift pattern indicated in the indicator 27 when startup the electric vehicle 1 may also be set as the basic pattern. By contrast, if the switching signal has been transmitted from the indication controller 34 so that the answer of step S1 is YES, the routine progresses to step S3 to switch the shift pattern indicated in the indicator 27 to the pattern instructed by the switching signal.

Then, at step S4, a selected shift position is determined. Specifically, the shift position set in the shift pattern currently indicated in the indicator 27 by operating the shift lever 16 (i.e., the selected virtual gear stage) is determined based on the detection signal transmitted from the shift position sensor 17. For example, given that the current shift position detected by the shift position sensor 17 is the position 5 in the shift pattern shown in FIG. 4A and the shift pattern shown in FIG. 4A is indicated in the indicator 27, the virtual gear stage determiner 31 determines that the fifth forward stage is selected. Whereas, given that the current shift position detected by the shift position sensor 17 is the position 5 in the shift pattern shown in FIG. 4A but the shift pattern shown in FIG. 4B is indicated in the indicator 27, the virtual gear stage determiner 31 determines that the seventh forward stage is selected.

Then, at step S5, the indication controller 34 transmits a signal to indicate the selected shift position on the shift pattern indicated in the indicator 27, and at step S6, the output controller 33 transmits a command to control the torque of the electric motor 2 in line with the characteristics associated with the selected virtual gear stage. Thereafter, the routine returns.

Thus, according to the exemplary embodiment of the present disclosure, the shift pattern indicated in the indicator 27 may be switched arbitrarily. In addition, the selected virtual gear stage may be indicated on the shift pattern indicated in the indicator 27, and the torque of the electric motor 2 may be controlled in line with the characteristics associated with the selected virtual gear stage. Therefore, even if the selected shift pattern may not be indicated entirely in the indicator 27, the number of the selectable virtual gear stages is larger than the number of the virtual gear stages possible to be indicated in the indicator 27. That is, the number of the selectable virtual gear stages by the virtual manual shifting operation is not restricted by the structure of the shifting device 18 and the electric vehicle 1. Therefore, characteristics of the torque generated by the electric motor 2 may be varied as much as possible utilizing the characteristics of the electric vehicle 1 having the virtual manual transmission system. In addition, a layout of the shift pattern is also not restricted and may be altered arbitrarily. Therefore, an operational feeling of the electric vehicle 1 may be customized in line with a preference of the driver so that the driver is allowed to enjoy the virtual manual shifting operation of the electric vehicle 1. Further, the shift pattern indicated in the indicator 27 may be switched in accordance with a speed of the electric vehicle 1. Therefore, the most suitable shift pattern and virtual gear stage may be selected depending on the running condition of the electric vehicle 1.

Although the above exemplary embodiment of the present disclosure has been described, it will be understood by those skilled in the art that the present disclosure should not be limited to the described exemplary embodiments, and various changes and modifications can be made within the scope of the present disclosure. For example, a paddle shifter may be employed instead of the shifting device 18. In this case, for example, a pair of upshift paddle and downshift paddle may be arranged behind the steering wheel. Instead, a paddle lever may also be arranged behind the steering wheel. In this case, the virtual gear stage is upshifted or downshifted and a symbol indicating the current virtual gear stage in the shift pattern indicated in the indicator 27 is shifted every time the paddle shifter is operated.

What is claimed is:

1. A shifting device for an electric vehicle having a virtual manual transmission system,
    wherein torque characteristics as a relation between a speed and a torque of an electric motor serving as a prime mover is selected from a plurality of the torque characteristics individually associated with each virtual gear stage, and
    the virtual gear stage is selected by a manual shifting operation,
    the shifting device comprising:
    an indicator that indicates a shift pattern having a plurality of shift positions to which the virtual gear stages are assigned; and
    an indication switcher that transmits a command to switch the shift pattern indicated in the indicator to another pattern,
    wherein at least any one of the number of the shift positions and the selected virtual gear stage assigned to the shift position in the shift pattern indicated in the indicator that is switched from the previous shift pattern by the indication switcher is different from the at least any one of the number of the shift positions and the selected virtual gear stage in the previous shift pattern previously indicated in the indicator.

2. The shifting device as claimed in claim 1,
    wherein the shift pattern is selected from a plurality of patterns in which the at least any one of the number of shift positions and the virtual gear stage assigned to the shift position is different, and
    the indication switcher is configured to transmit a command to indicate the selected shift pattern in the indicator.

3. The shifting device as claimed in claim 1,
    wherein the indicator is configured to indicate a part of the shift pattern in the indicator, and
    the indication switcher is configured to transmit a command to switch the part of the shift pattern indicated in the indicator.

4. The shifting device as claimed in claim 1, wherein the indication switcher is configured to transmit the command to switch the shift pattern in accordance with a speed of the electric vehicle.

5. The shifting device as claimed in claim 4, further comprising:
   a torque characteristics controller that transmits a command to control the electric motor to generate torque in line with the torque characteristics associated with the selected virtual gear stage assigned to the shift position,
   wherein the torque characteristics controller is configured to maintain the current torque characteristics after the shift pattern is switched to the another pattern and the selected virtual gear stage indicated in the indicator is changed.

6. The shifting device as claimed in claim 4, further comprising:
   a torque characteristics controller that transmits a command to control the electric motor to generate torque in line with the torque characteristics associated with the selected virtual gear stage assigned to the shift position,
   wherein the torque characteristics controller is configured to transmit a command to control the electric motor to generate torque in line with the torque characteristics associated with the current virtual gear stage assigned to the current shift position in the shift pattern switched from the previous shift pattern.

7. The shifting device as claimed in claim 1, wherein the indication switcher is configured to transmit the command to switch the shift pattern in response to a manual operation executed by a driver of the electric vehicle.

8. The shifting device as claimed in claim 7, further comprising:
   a torque characteristics controller that transmits a command to control the electric motor to generate torque in line with the torque characteristics associated with the selected virtual gear stage assigned to the shift position,
   wherein the torque characteristics controller is configured to maintain the current torque characteristics after the shift pattern is switched to the another pattern and the selected virtual gear stage indicated in the indicator is changed.

9. The shifting device as claimed in claim 7, further comprising:
   a torque characteristics controller that transmits a command to control the electric motor to generate torque in line with the torque characteristics associated with the selected virtual gear stage assigned to the shift position,
   wherein the torque characteristics controller is configured to transmit a command to control the electric motor to generate torque in line with the torque characteristics associated with the current virtual gear stage assigned to the current shift position in the shift pattern switched from the previous shift pattern.

10. The shifting device as claimed in claim 1, further comprising:
    a torque characteristics controller that transmits a command to control the electric motor to generate torque in line with the torque characteristics associated with the selected virtual gear stage assigned to the shift position,
    wherein the torque characteristics controller is configured to maintain the current torque characteristics after the shift pattern is switched to the another pattern and the selected virtual gear stage indicated in the indicator is changed.

11. The shifting device as claimed in claim 1, further comprising:
    a torque characteristics controller that transmits a command to control the electric motor to generate torque in line with the torque characteristics associated with the selected virtual gear stage assigned to the shift position,
    wherein the torque characteristics controller is configured to transmit a command to control the electric motor to generate torque in line with the torque characteristics associated with the current virtual gear stage assigned to the current shift position in the shift pattern switched from the previous shift pattern.

* * * * *